:::
United States Patent [19]

Byron

[11] Patent Number: 5,420,948

[45] Date of Patent: May 30, 1995

[54] CHIRPED OPTICAL FIBRE FILTER

[75] Inventor: Kevin C. Byron, Bishop's Stortford, United Kingdom

[73] Assignee: Northern Telecom Limited, Montreal, Canada

[21] Appl. No.: 289,940

[22] Filed: Aug. 12, 1994

[30] Foreign Application Priority Data

Aug. 12, 1993 [GB] United Kingdom ............... 9316738

[51] Int. Cl.⁶ .............................................. G02B 6/34
[52] U.S. Cl. ..................................... 385/37; 359/573; 359/575; 385/43
[58] Field of Search .................... 385/37, 43; 359/566, 359/569, 573, 575

[56] References Cited

U.S. PATENT DOCUMENTS

| | | | |
|---|---|---|---|
| 4,096,446 | 6/1978 | Haus et al. | 331/94.5 C |
| 4,285,569 | 8/1981 | Yao et al. | 385/37 |
| 4,665,660 | 5/1987 | Jablonski et al. | 385/43 |
| 4,874,216 | 10/1989 | Utaka et al. | 385/9 |
| 5,033,812 | 7/1991 | Yoshida et al. | 385/37 |
| 5,058,979 | 10/1991 | Yamauchi et al. | 385/28 |
| 5,208,882 | 5/1993 | Strasser et al. | 385/37 |

FOREIGN PATENT DOCUMENTS 2161612 1/1986 United Kingdom ........... H04B 9/00

OTHER PUBLICATIONS

Meltz, "Formation of Bragg gratings in optical fibers by a transverse holographic method", Optics Letters, vol. 14, No. 15, Aug. 1, 1989, pp. 823–825.

Askins, "Fiber Bragg reflectors prepared by a single excimer pulse, Optics Letters", vol. 17, No. 11, Jun. 1, 1992, pp. 833–835.

Primary Examiner—Frank Gonzalez
Attorney, Agent, or Firm—Lee, Mann, Smith, McWilliams, Sweeney & Ohlson

[57] ABSTRACT

A chirped distributed Bragg grating optical fibre filter comprises an adiabatically tapered single mode optical fibre provided on the taper with a distributed Bragg grating of uniform pitch.

1 Claim, 2 Drawing Sheets

CHIRPED OPTICAL FIBRE FILTER

BACKGROUND OF THE INVENTION

This invention relates to the production of chirped distributed Bragg grating single mode optical fibre filters. A particular, though not exclusive, application for such filters is to be found in the provision of optical fibre dispersion equalisers, as for instance described in GB 2 161 612A, to which attention is directed.

GB 2 161 612A describes a way of making a distributed Bragg grating in a length of photo-responsive single mode optical fibre by launching into it a high-power beam of light, and by using a reflector to set up a standing wave pattern in the fibre. This standing wave pattern produced localised changes in the refractive index of the fibre, resulting in the production of a narrow-band (un-chirped) filter which is selectively reflective at the wavelengths of the light employed to create it. The specification explains that a chirped filter can be synthesised from a number of discrete filters of progressively different centre-wavelengths. It is suggested that those sections can be made either by using light of different wavelengths for the construction of the different sections, or by using light of the same wavelength for constructing each of them, and then altering the periodicity of different ones by different amounts. The method by which it is proposed that this change in periodicity should be brought about is either by elastic stretching of the fibres prior to generation of the grating and then allowing them to relax afterwards, or by performing the operations in the reverse sequence. It is also proposed that, by arranging to set up a stress/strain gradient in a single length of fibre, these processes can be adapted to produce a single-section chirped filter.

An alternative way of making a distributed Bragg grating in a photoresponsive single mode optical fibre is described by G Meltz et al in article entitled: "Formation of Bragg Gratings in Optical Fibres by Transverse Holographic Method", Optics Letters, 1989, 14, (15), pp 823-825. This involves illuminating the fibre from the side with a holographically generated grating fringe pattern. When such fringe patterns are generated with interfering beams of collimated light, the resulting grating is of uniform pitch, though chirped gratings can also be generated by the expedient of using interfering beams of differing divergence.

Both types of method of making distributed Bragg gratings so far described have involved the use of light to create a phase grating in the fibre. A different type of grating, known as a type II grating, is similarly made in single mode optical fibre by lateral holographic illumination, but in this instance the grating fringe pattern is formed much more rapidly, typically using a single short duration pulse from an excimer laser. The creation of such type II gratings is for instance described by C G Askins et al in an article entitled: "Fibre Bragg Reflectors Prepared by a Single Excimer Pulse", Optics letters, 1992, 17 (15) pp 833-835.

With the exception of the interfering beams of different divergence method of coating a chirped distributed Bragg grating optical filter, the above referenced methods of making such chirped filters involve significant additional complexity in comparison with the corresponding above-referenced methods of making uniform pitch filters. A drawback of the interfering beams of different divergence method of making chirped filters lies in the exercise of suitable control over those divergences necessary to create a chirped filter to a specific chirp recipe.

SUMMARY OF THE INVENTION

The present invention is directed to a new type of chirped distributed Bragg grating single mode optical fibre filter, one which can be made by a method in which the chirp may relatively readily be set up to a specific recipe.

According to the present invention there is provided a chirped distributed Bragg grating optical fibre filter comprising an adiabatically tapered single mode optical fibre provided on the taper with a distributed Bragg grating of uniform pitch.

When forming a distributed Bragg grating single mode optical fibre chirped filter by a method involving lateral illumination of the fibre with a fringe pattern, either the spacing of the grating fringes must be non-uniform down the length of the grating, or the waveguiding properties of the fibre defining it, effective refractive index, neff, must be non-uniform down the length of the grating. The present invention utilises the second option, providing a variation in neff as a function of position along the length of the optical fibre by tapering its diameter. The drawing down of the diameter of a single mode fibre has the effect of reducing its neff. For a time the value of neff reduces substantially linearly with core diameter. Phenomenologically this reduction can be explained as the effect of the expansion of the model spot size resulting in an ever greater proportion of the guided energy being caused to propagate in the cladding rather than in the higher refractive index core region. Then, with further reduction in fibre diameter the rate of reduction in neff falls off for a time before once again increasing in rate. The reduction in rate may be phenomenologically explained as occurring at the time when the role of the principal guidance interface changes over from that of the core glass: cladding glass interface to the glass: air interface at the surface of the fibre.

The establishment of the mathematical relationship between fibre diameter and effective refractive index has been the subject of numerical analysis, for instance by R A Sammut et al: "Simplified Numerical Analysis of Optical Fibres and Planar Waveguides", Electronics Letters, 1981, 17, (3) pp 105-106. Given therefore the opportunity of developing in an optical fibre a Bragg grating of a specific uniform pitch, it is possible to derive mathematically the specific taper profile necessary to satisfy a given requirement of filter chirp. The production of the specific taper profile is conveniently achieved by a method derived from the specific progressive stretching method of making biconical fused fibre tapered couplers that is described in GB 2 150 703A.

The essence of this progressive stretching method, as applied to couplers, is that two or more fibres are stranded together and mounted between a pair of clamps that themselves are mounted on independent motor-driven linearly sliding carriages. The two sliding carriages move along a common axis, and the stranded fibres are arranged to extend parallel to this axis. Movement of the two carriages in the same direction, but with the leading carriage constrained to move slightly faster than the trailing carriage, causes the fibres to be progressively stretched. A relatively sharply localised hot zone, provided for instance by a methane oxygen flame issuing from the end of a length of hypodermic tubing, is moved into position where it locally heat-softens the fibres so that their stretching is accommodated by plastic flow confined to the region of the hot zone. The traversing of the two carriages means that the localised plastic flow is itself traversed along the fibres at a controlled rate. In this way a single traverse of the carriages will produce a drawn-down region of the fibres, the length of which is determined by the extent of the traverse. The cross-sectional reduction is independent of the length of the traverse, and is determined by the ratio of the speeds at which the two carriages are driven. To make a fused fibre coupler by this progressive stretching method, several, or even a few tens of, traverses may be employed to achieve the requisite aggregate drawdown ratio. Clearly, for each one of these traverses the linear extent of its draw-down, and the value of its draw down ratio, can be chosen independently of each other, and also independently of the values of these parameters chosen for any one the other traverses.

Conveniently, the positioning, timing, and rates of traverse of each of the carriages, the movement of the hot zone in and out of position to heat-soften the fibres, and the regulation of the temperature of the hot zone through regulation of the gas flows feeding the flame, may all be operated under numerical control to provide couplers to any desired recipe. By substituting a single mode fibre for the two or more stranded fibres employed in coupler fabrication, this method of controlled draw-down is well suited to the production of tapered single fibres to any desired recipe.

BRIEF DESCRIPTION OF THE DRAWINGS

There follows a description of the manufacture of a chirped distributed Bragg grating single mode optical filter embodying the invention in a preferred form. The description refers to the accompanying drawings in which.

DETAILED DESCRIPTION OF THE PREFERRED EMBODIMENT

Figure 1:
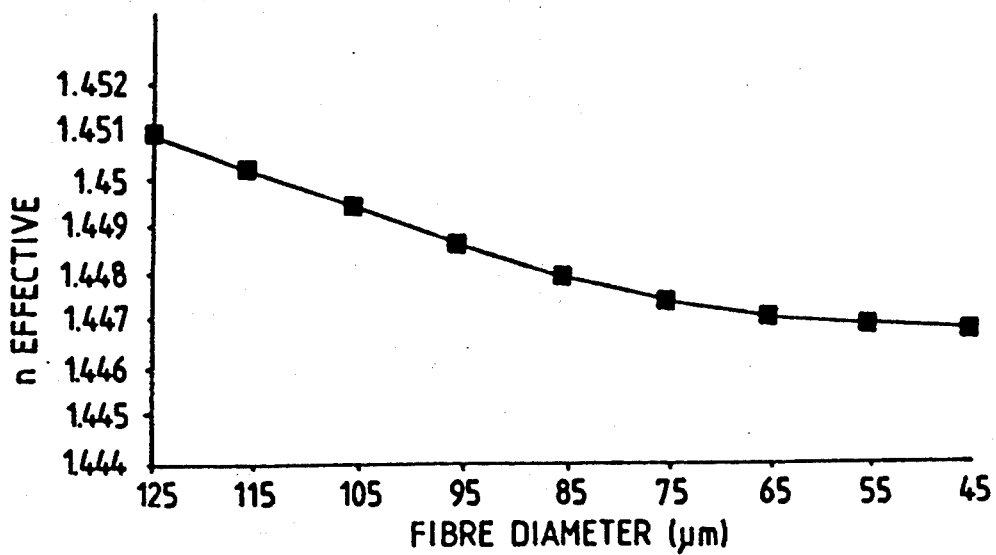
FIG. 1 is a plot of the calculated variation in effective refractive index, as a fraction of fibre diameter, in respect of a specific construction of enhanced photosensitivity single mode fibre employed in the construction of the filter.
Figure 2:
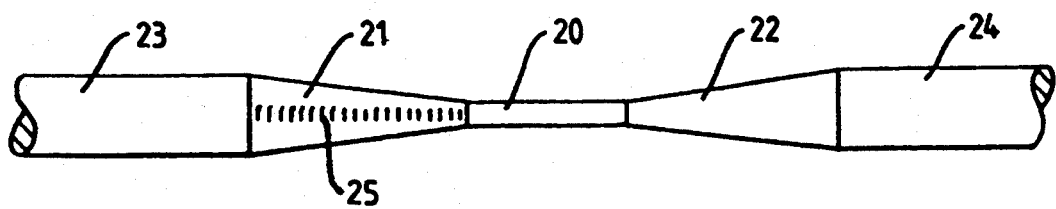
FIG. 2 is a schematic depiction of a progressively stretched optical fibre from which a pair of fibre tapers may be obtained.

The numerical analysis method of R. A. Sammut et al, to which previous reference has been made, was used to generate the plot illustrated in FIG. 1 of effective refractive index as a function of fibre diameter in respect of a specific construction of boron/germania doped single mode fibre exhibiting enhanced photosensitivity. Using this information, a recipe of progressive stretching was devised which involved the use of about twenty traverses to provide, in a length of 125 $\mu$m diameter fibre, a drawn-down region 20 (FIG. 2) of substantially uniform cross section 50 $\mu$m in diameter that is linked by two substantially linear tapers 21, 22, each approximately 10 mm long, with unstretched (full 125 $\mu$m diameter) portions 23, 24 of the fibre.

Figure 3:
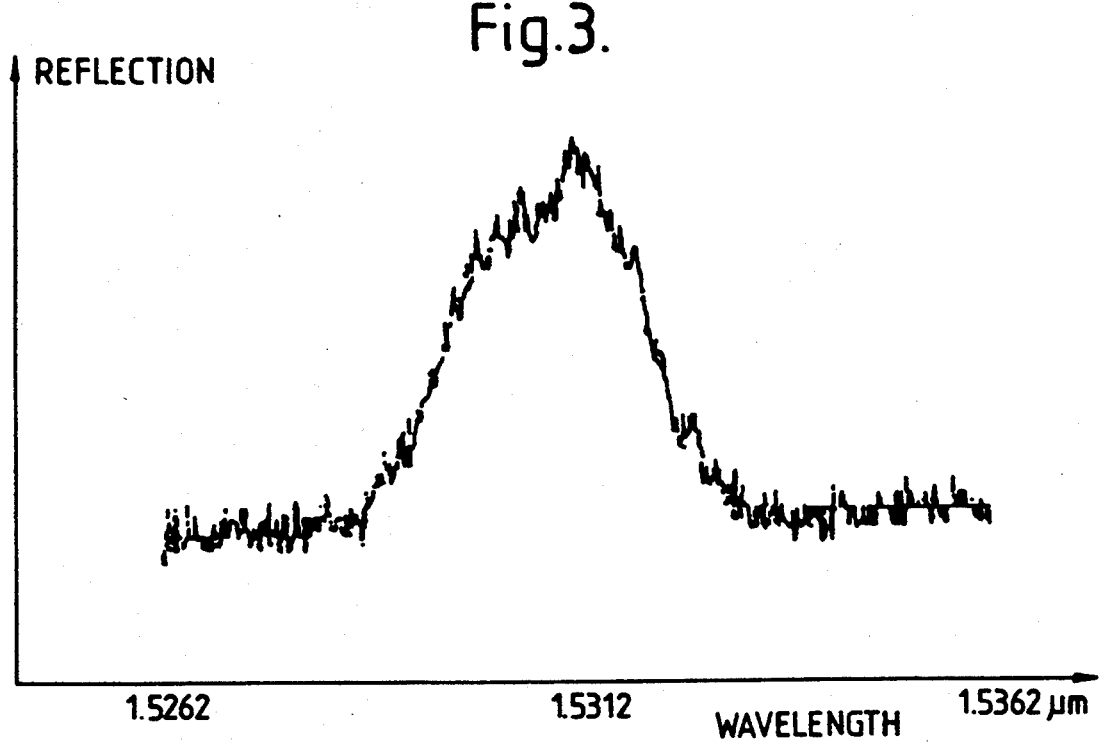
FIG. 3 is a plot of the refraction filter characteristic of the completed filter from one of the tapers of FIG. 2, and FIG. 4 (provided for purposes of comparison) is a plot of the reflection filter characteristic of a filter created with substantially the same distributed Bragg grating as that possessed by the filter of FIG. 1, but created in an untapered fibre.

One of the tapers 21, 22 was separated from its pair, and a CW frequency-doubled Argon-ion laser producing 55 mW of UV radiation was used to generate two collimated beams interfering to produce a uniform pitch fringe pattern to extend the length of the taper. This fringe pattern acted upon the photosensitive fibre taper to produce a distributed Bragg phase grating 25 in the taper thereby forming a chirped filter. The reflection characteristic of this filter is depicted in FIG. 3. The filter shows a peak reflectivity of 20% at 1.5312 nm and a bandwidth (FWHM) of 2.7 nm.

Figure 4:
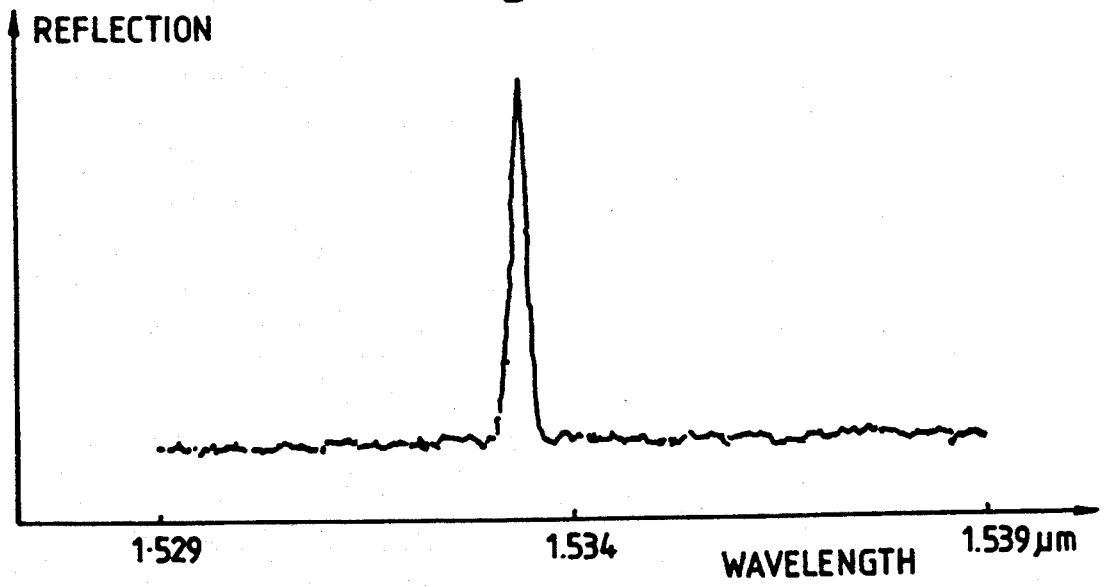

The effect of the chirp in broadening the bandwidth of the filter can be inferred from comparison of this characteristic of FIG. 3 with that of FIG. 4. The FIG. 4 characteristic was obtained from a filter substantially the same as that of the filter of FIG. 3, except for the fact that in this instance the grating was produced in untapered fibre to produce a filter with no intentional chirp. In this instance the peak reflectivity, which occurs at about 1.534 $\mu$m, is somewhat greater than that of the chirped filter. Its bandwidth is however significantly reduced, being about 0.25 nm, as compared with 2.7 nm for the chirped filter of FIG. 3. The reflective efficiently of the chirped filter of FIG. 3 is low compared to that of the unchirped filter of FIG. 4, but could be increased by a longer interaction length and/or a lower gradient of taper.

I claim:

1. A chirped distributed Bragg grating optical fibre filter comprising an adiabatically tapered single mode optical fibre provided on the taper with a distributed Bragg grating of uniform pitch.

* * * * *